US007426620B2

(12) United States Patent
Yeh

(10) Patent No.: US 7,426,620 B2
(45) Date of Patent: Sep. 16, 2008

(54) APPARATUS AND METHOD FOR MEMORY ACCESS OF SHARING BUSES

(75) Inventor: Ting-Kun Yeh, Taipei (TW)

(73) Assignee: VIA Technologies, Inc. (TW)

( * ) Notice: Subject to any disclaimer, the term of this patent is extended or adjusted under 35 U.S.C. 154(b) by 380 days.

(21) Appl. No.: 10/924,964

(22) Filed: Aug. 25, 2004

(65) Prior Publication Data
US 2005/0088896 A1 Apr. 28, 2005

(30) Foreign Application Priority Data
Oct. 24, 2003 (TW) .............................. 92129662 A

(51) Int. Cl.
*G06F 12/00* (2006.01)
*G06F 13/00* (2006.01)
*G06F 13/28* (2006.01)
(52) U.S. Cl. ..................... 711/168; 711/4; 711/147; 710/100; 369/47.38; 360/73.03
(58) Field of Classification Search ................. 711/168, 711/4
See application file for complete search history.

(56) References Cited

U.S. PATENT DOCUMENTS 5,995,709 A * 11/1999 Tsuge ....................... 386/95

6,480,929 B1 * 11/2002 Gauthier et al. ............. 711/105
6,718,443 B2 * 4/2004 Yoshida ..................... 711/147
2003/0070049 A1 * 4/2003 Suzuki ....................... 711/151
2004/0062126 A1 * 4/2004 Takemae .................... 365/222

OTHER PUBLICATIONS

Gerritsen, Armin, CISC vs. RISC, Mar. 1999, p. 1.*

* cited by examiner

*Primary Examiner*—Matt Kim
*Assistant Examiner*—Edward J Dudek
(74) *Attorney, Agent, or Firm*—Arent Fox LLP

(57) ABSTRACT

An apparatus and a method for memory access of sharing the address and the data buses used in multi-media player, comprising at least one SDRAM, storing the large data and as a buffer in high speed; at least one flash memory, storing the programs, the user's defaults and firmware, wherein the address and data pins of the SDRAM and the flash memory are coupled with a same bus respectively, and SDRAM and flash memory are not accessed at the same time; a memory interface, connecting the address bus and data bus shared by the SDRAM and flash memory. The memory interface further comprises an arbiter, deciding which one of the access requests is executed according to the request priority. It is noticed that only one of the SDRAM or the flash memory can be accessed at one time.

17 Claims, 5 Drawing Sheets

APPARATUS AND METHOD FOR MEMORY ACCESS OF SHARING BUSES

BACKGROUND OF THE INVENTION

1. Field of the Invention

The present invention generally relates to an optical disk control chip with memory buses sharing apparatus, and more particularly to an optical disk control chip with SDRAM and flash memory buses sharing.

2. Description of the Related Art

As the requirement of consumer media electronic products increasing, in order to enhance the product competition, the concept of SoC (System On Chip, SoC) has become a trend. Due to the device integrated, the chip with SoC concept have less power consumption, greater heat dissipation, and better signal sending quality. Moreover, the concept of SoC is to put more and more devices into one single chip, so each device in this chip have to be integrated or reduced its size in order to meet the concept of SoC. With the integration of devices, the use of devices and substrates can be reduced. Due to the reduction of size of devices, the volume of chip is reduced, and also the package is reduced, so the cost of the chip designed with the concept of SoC can be reduced.

a well-known architecture of a multi-media player 100 as shown in FIG. 1, which comprises of a control unit 110, a MPEG (Moving Picture Experts Group) unit 120, an optical storage media 101, a video output interface 102, and an audio output interface 103. The control unit 110 further comprises a servo controller 112, and a microprocessor unit 114; the MPEG unit 120 further comprises a central processor unit (CPU) 121, a MPEG decoder 122, a video encoder 125, and a DA/AD converter (digital to analog/analog to digital converter, DAC/ADC) 126. The control unit 110 couples to a first synchronous dynamic random access memory (SDRAM) unit 116 and a first flash memory unit 118; the MPEG unit 120 couples to a second synchronous dynamic random access memory (SDRAM) unit 123 and a second flash memory unit 124.

A well-known multi-media player working flow chart is as the following: when optical storage media 101 is put into multi-media player 100, servo controller 112 drives the motor to readout disk data, these data are stored into the first SDRAM unit 116 then readout and decoded and stored back to the first SDRAM unit 116; these data are transmitted from the first SDRAM unit 116 to MPEG decoder 122, and then stored into the second SDRAM unit 123 then readout and decoded and stored back to the second SDRAM unit 123; finally, these data are streamed, the video data are transmitted to video encoder 125 and transfer to NTSC or PAL form and then displayed in video output interface 102, the audio data are transmitted to DAC/ADC 126 then output by audio output interface 103. During data decoding, microprocessor 114 and CPU 121 also access the first and second flash memory units 118 and 124.

In order to handle large data, servo controller 112, CPU 121, microprocessor 114 and MPEG decoder 122 of multi-media player 100 require much memory space respectively, as a result, synchronous dynamic random access memory unit 116 and 123 should contain numbers of synchronous dynamic random access memories (SDRAMs) for temporary storing a large data of programs and as a buffer in high speed for superior playing quality. These same working function pins of SDRAMs could share a same bus to reduce occupied space of pins. Otherwise, flash memory unit 118 and 124 of multi-media player 100 should contain numbers of flash memories for storing programs, user's defaults, and firmware. Similarly, these same working function pins of flash memories could share a same bus.

The respective relationship between processors and memories of multi-media player 100 is shown in FIG. 2. Microprocessor 114 and CPU 121 could directly command access requests to first and second flash memory unit 118 and 124 respectively. However, servo controller 112 and MPEG decoder 122, each one having many controllers or processors in it and lots of them could command access requests at the same time, as a result an arbiter (such as Arbiter 210, 220) is necessary, to arbitrate which one of these access requests has a priority and which one of these access requests is executed.

A well-known multi-media player with at least one SDRAM and at least one flash memory simultaneously could increase system performance. The advantage of flash memory is keeping data without refresh frequently, and the data, such as initial programs, firmware, and user's defaults, is not loss when system powers down; and taking the advantages of high speed access of SDRAMs, writing these data which is read from flash memory into SDRAMs when system powers on or before accessing the data in the flash memory, because data are executed in SDRAMs, the access speed and performance of system are both increased.

The flow chart is shown in FIG. 3:

310: reading data from flash memory;

320: writing data into SDRAMs; and

330: waiting for microprocessor to read and execute the data in SDRAM.

It is noticed that using large memories could store much more data but also occupy much more memory space.

It is also noticed that because of slow access speed of flash memories and fast access speed of SDRAM, programs or data stored in flash memory could cause lower system performance; thus, at most time, system accessing data or performing programs from SDRAM improves system performance. However, flash memories are accessed only when system powers on or when accessing user's defaults. When flash memories are not accessed, the idle buses of flash memories and un-used pins are also waste of systems. In a word, whether flash memories are accessed or not, system buses using efficiency is low.

As the descriptions above, the present invention provides an apparatus and a method for memory access of sharing buses. With this invention, controllers and processors of system could use the same SDRAM and flash memory units, so the numbers of memories and the memory space both are reduced. In addition, the SDRAMs and flash memories units could use the same memory buses, so the memory pin numbers are further reduced and the buses using efficiency increase.

SUMMARY OF THE INVENTION

The present invention provides an apparatus and a method for memory access of reducing memory pin numbers for SoC concept.

The present invention also provides an apparatus and a method for memory access of efficient using memory address and data buses.

In the preferred embodiment of the present invention, the apparatus of memory access comprising of a synchronous dynamic random access memory, storing large data and as a buffer; a flash memory, storing programs, user's defaults and firmware; and a memory interface, operating between microcontroller or microprocessor and memories, wherein the memory interface further comprising an arbiter, deciding which one of the access requests is executed according to the request priority.

In the preferred embodiment of the present invention, one selected memory uses the sharing address and data buses, another non-selected memory do not use the sharing address and data buses, and only one memory is selected at one time.

In the preferred embodiment of the present invention, when this apparatus using in a optical disk control chip further comprises a servo controller, a high-level microprocessor, a digital signal processor (DSP), a video decoder, and a video processor. All of these controllers and processors would command access requests.

In the preferred embodiment of the present invention, the memory access steps are as the following: commanding numbers of access requests; deciding which one of the access requests is executed according to the request priority; deciding which one of the memories is accessed according to the selected request; enabling the command pin of the selected memory and disable the others; and, the selected memory using the sharing address and data buses.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

The present invention provides an apparatus and a method for a optical disk control chip of sharing memory. With the present invention, the memory space of a chip could be reduced; furthermore, using the sharing address and data buses, the memory access speed and the memory buses using efficiency could be increased without increasing memory space. Finally, the present invention helps to achieve SoC concept.

A preferred embodiment is given as following to enable one of ordinary skilled in the art to make and use the present invention as provided within the context of a particular application and its requirements. Various modifications to the preferred embodiment will, however, be apparent to one skilled in the art, and the general principles defined herein may be applied to other embodiments. Therefore the present invention is not intended to be limited to the particular embodiments shown and described herein, but is to be accorded the widest herein disclosed.

Figure 4:
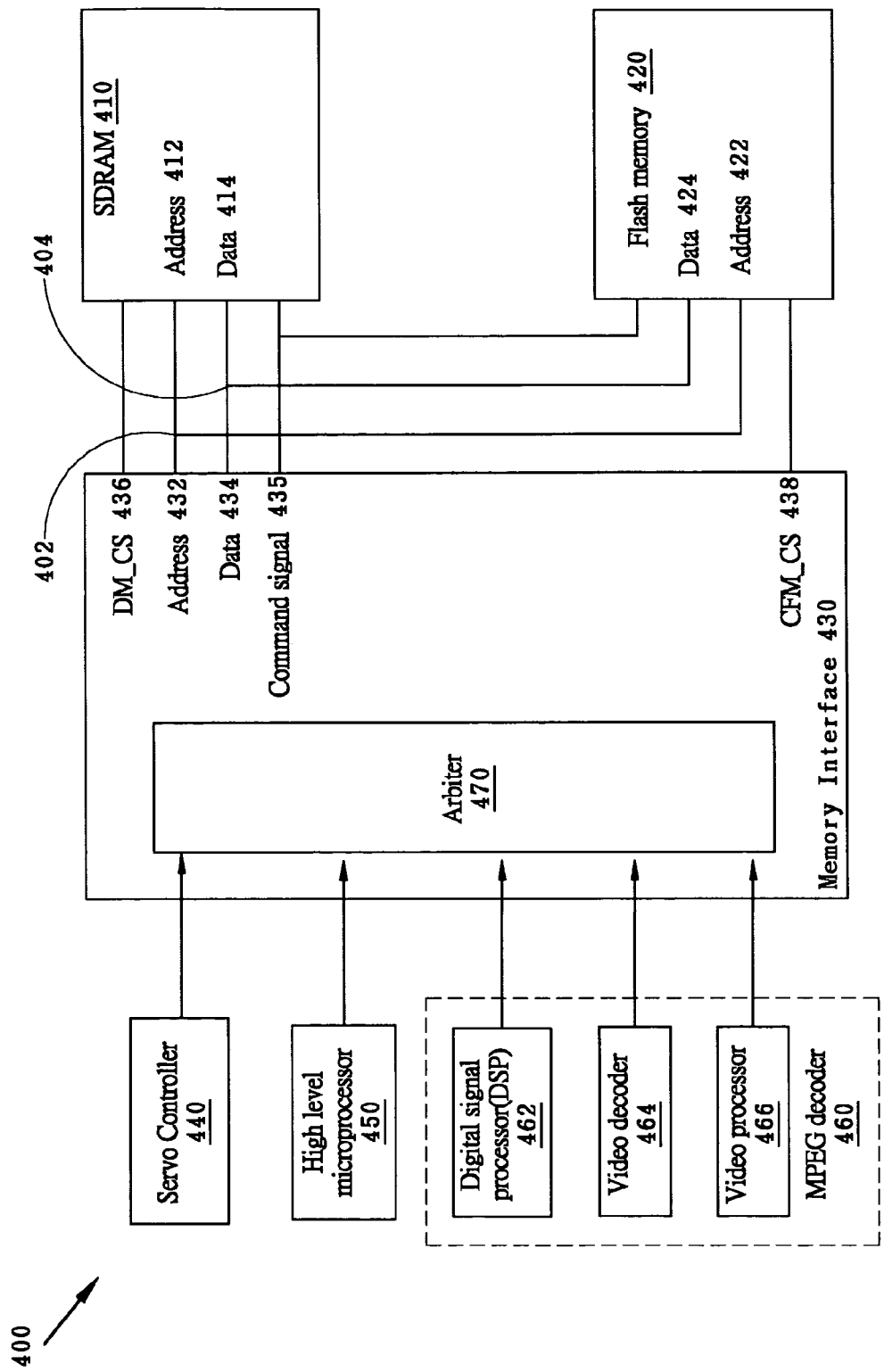
FIG. 4 is a diagram showing an apparatus of sharing memory address and data buses of multi-media player according to the present invention.

FIG. 4 schematically shows an apparatus of sharing memory address and data buses 400 according to the present invention, comprising a SDRAM 410, storing large data and as a buffer in high speed for superior playing quality; a flash memory 420, storing programs, user's defaults and firmware; a servo controller 440, driving the motor to readout disk data in optical storage media; a high level microprocessor 450, executing programs; a MPEG decoder 460, processing video and audio signals; and a memory interface 430, operating between processors and memories.

Figure 1:
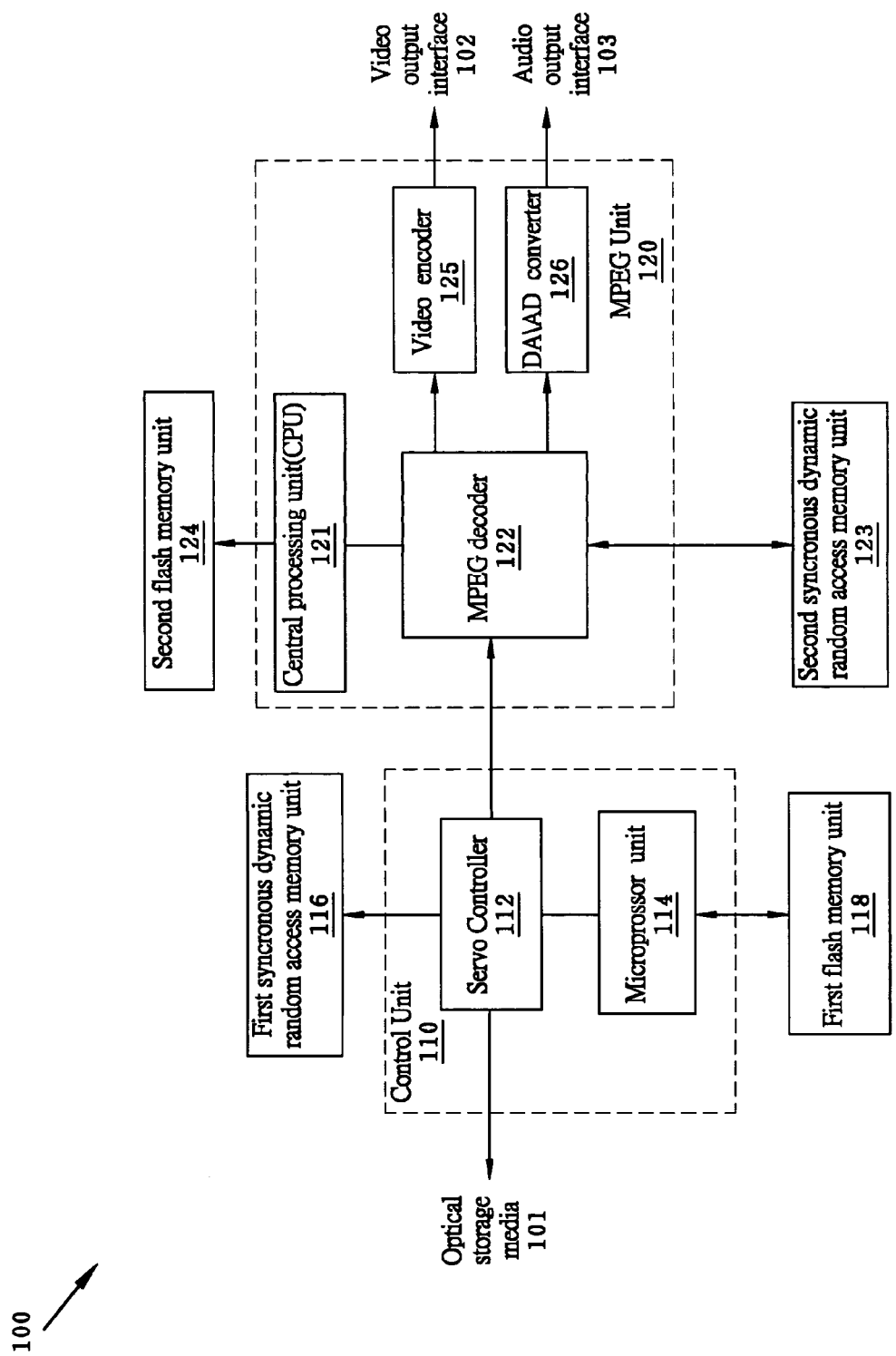
FIG. 1 is a diagram showing architecture of a multi-media player.
Figure 2:
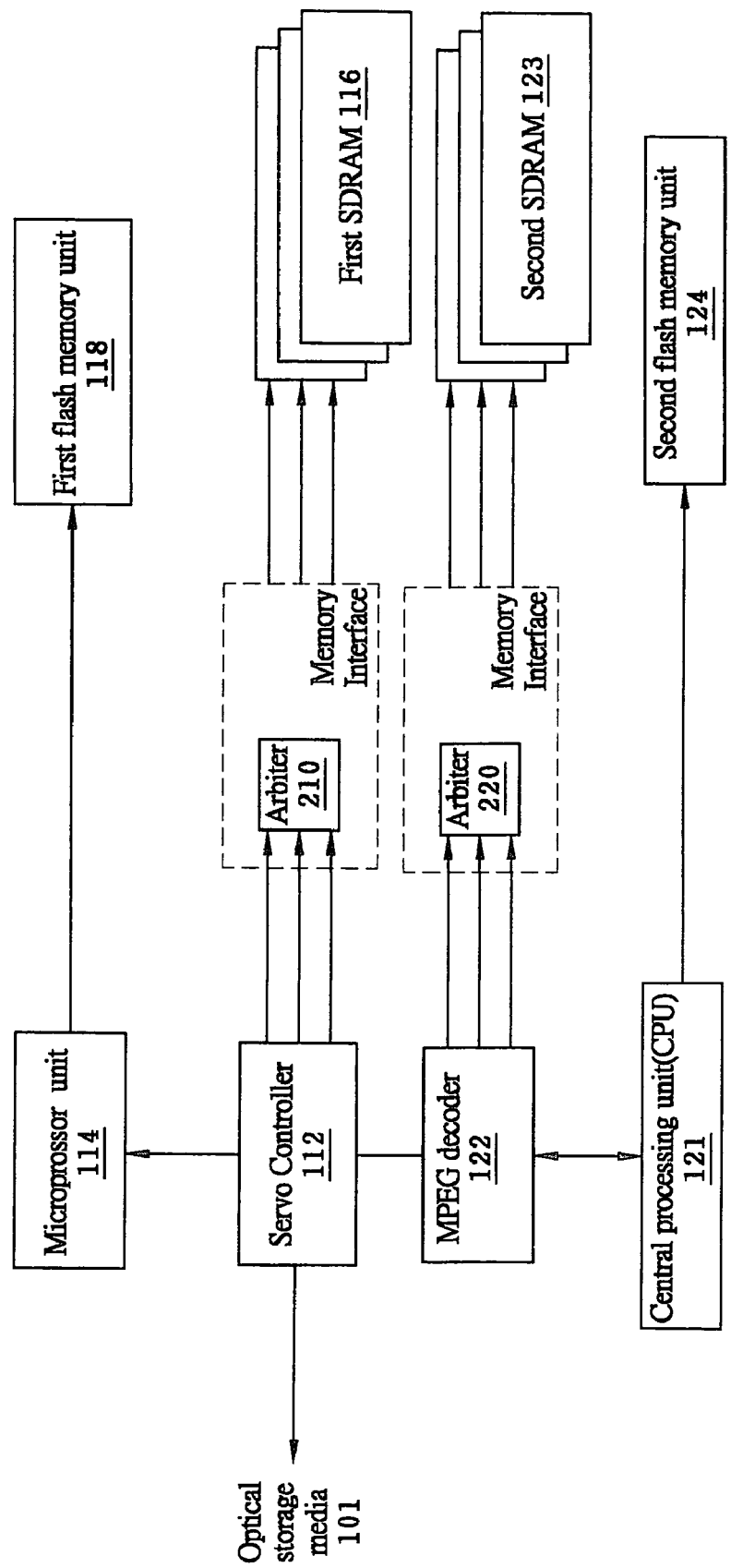
FIG. 2 is a diagram showing a relationship between processors and memories of multi-media player.
Figure 3:
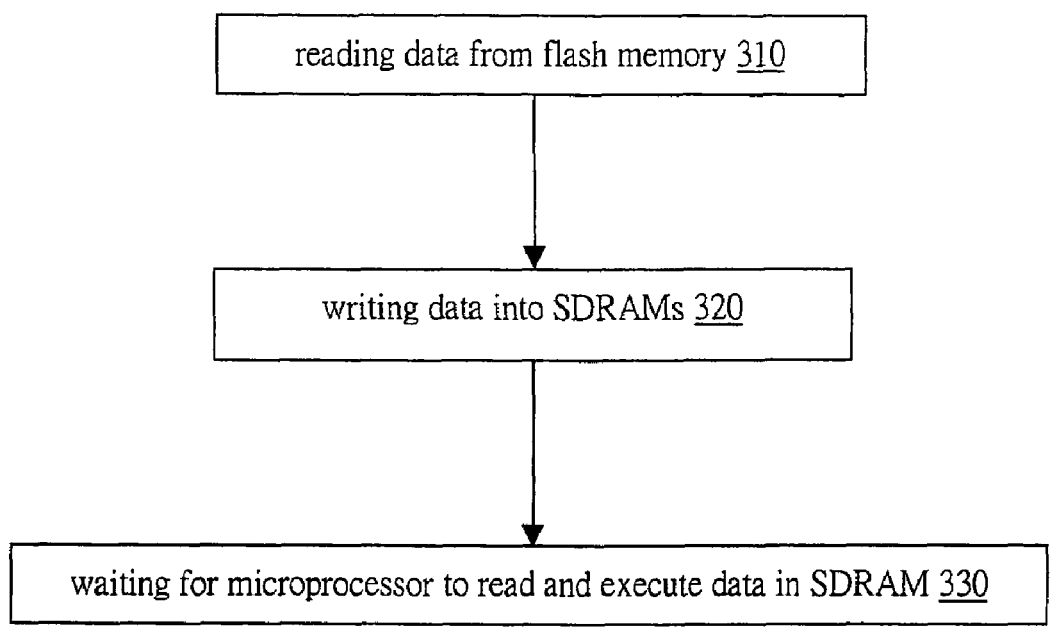
FIG. 3 is a flow chart showing a method of increasing the performance of memory access of multi-media player.

Unlike the CPU 121 and microprocessor 114 of FIG. 1, the present invention integrates the most microprocessors of system by using a high level microprocessor 450 with higher clocks, to achieve the SoC concept.

In the present invention, the address pin 412 and data pin 414 of SDRAM 410 respectively share the same buses 402, 404 with the address pin 422 and data pin 424 of flash memory 420. The sharing buses 402 and 404 are respectively coupled to address pin 432 and data pin 434 of memory interface 430. Additionally, memory interface further comprises two command signal pins 436 and 438 corresponding to SDRAM 410 and flash memory 420; and a command signal 435. Deciding which one of the memories, SDRAM 410 or flash memory 420, is selected to be accessed according to which one of the command signal pins 436 or 438 is enabled, and sending out corresponding command signal by command signal 435. It is noticed that, command signal pin 436 and 438 couldn't be enabled at the same time, that is to say, SDRAM 410 and flash memory 420 couldn't be accessed at the same time.

The MPEG decoder 460 of present invention further comprises a digital signal processor (DSP) 462, processing audio signals; a video decoder 464, decoding video signals; and a video processor, processing decoded video signals.

The memory interface 430 of present invention further comprises an arbiter 470, coupling with the servo controller 440, the high level microprocessor 450, the DSP 462, the video decoder 464, and the video processor 466.

The servo controller 470, the high level microprocessor 450, the DSP 462, the video decoder 464, and the video processor 466 would command access requests to access data of SDRAM 410 or flash memory 420. The arbiter 470 decides which one of the access requests has the priority and which one of the access requests is executed according to the request priority. Then according to the selected access request to decide which one of the memories, SDRAM 410 or flash memory 420 is accessed.

After a memory is selected, command signal 435 of memory interface 430 would enable the corresponding command signal pin, and disable another; additionally, the memory interface 430 further comprises a control machine (not shown in FIG. 4) which could control the sharing address and data buses only providing to the selected memory and prevent the non-selected memories using the sharing address and data buses. In other words, to achieve the object of sharing buses, there is only one memory could be selected at one time.

When SDRAM 410 is selected and to be accessed according to the selected access request, the command signal pin 436 of SDRAM 410 is enabled and the command signal pin 438 of flash memory 420 is disabled, SDRAM 410 uses the sharing address and data buses and waits for execution of the enabling processor. On the contrary, when flash memory 420 is selected to be accessed according to the selected access request, the command signal pin 438 of flash memory 420 is enabled and the command signal pin 436 of SDRAM 410 is disabled, flash memory 420 uses the sharing address and data buses and waits for execution of the enabling processor.

Figure 5:
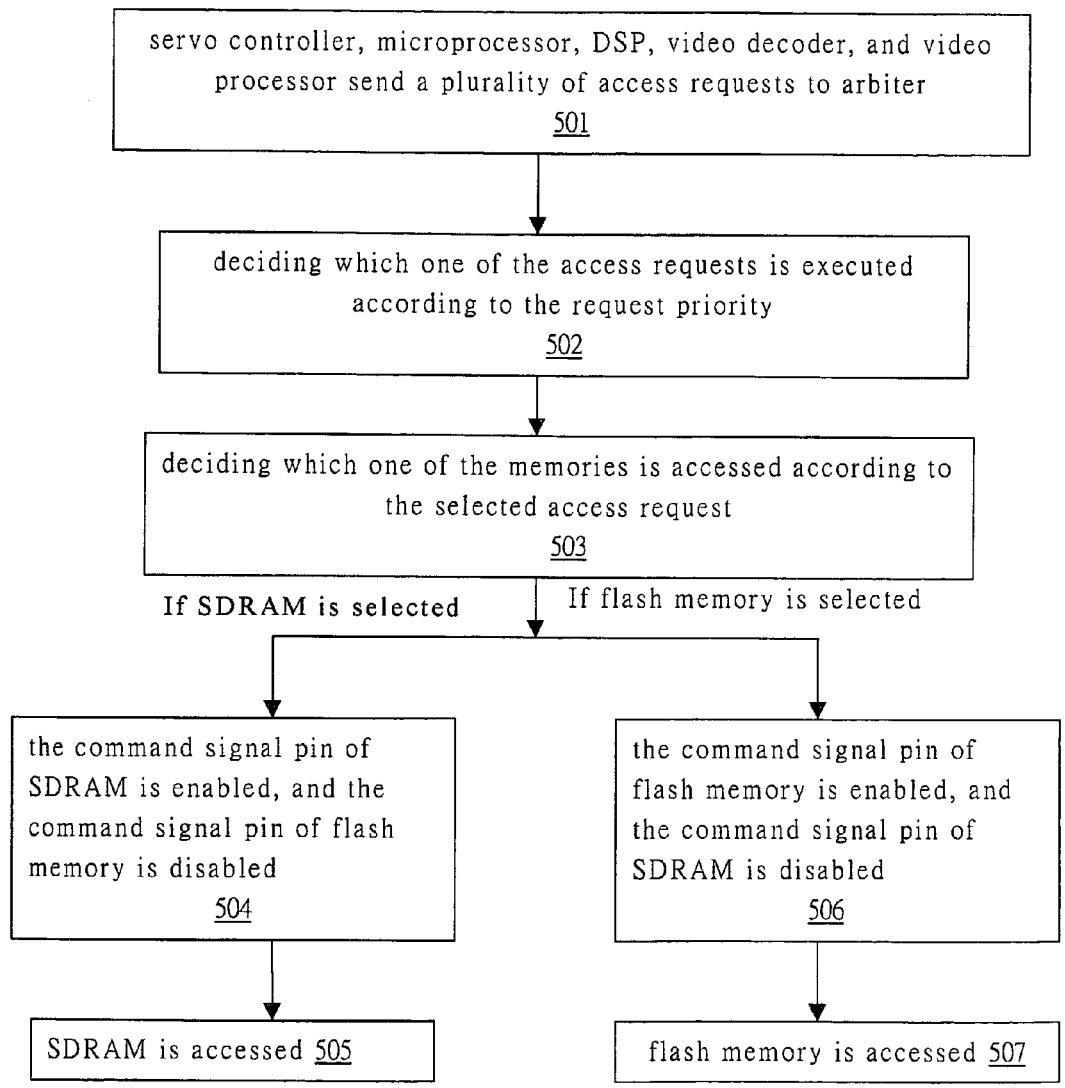
FIG. 5 is a flow chart showing a method of sharing memory address and data buses of multi-media player according to the present invention.

FIG. 5 schematically shows a flow chart of sharing memory address and data buses of a preferred embodiment according to the present invention, the steps are as the following:

501: servo controller, microprocessor, DSP, video decoder, and video processor send a plurality of access requests to arbiter;
502: deciding which one of the access requests is executed according to the request priority;
503: deciding which one of the memories is accessed according to the selected access request;
If SDRAM is selected
504: the command signal pin of SDRAM is enabled, and the command signal pin of flash memory is disabled;
505: SDRAM is accessed;
Otherwise, if flash memory is selected
506: the command signal pin of flash memory is enabled, and the command signal pin of SDRAM is disabled; and
507: flash memory is accessed.

As the descriptions above, the present invention provides a better solution to reduce memory space of system and more reduction of chip size to achieve SoC concept.

Comparing to the prior art, because of sharing memory address and data buses, only one memory uses these sharing buses in one time, thus it could avoid bus idling when SDRAMs are waiting and when flash memories are non-used. As a result, the present invention provides a better solution to speed memory access and buses using efficiency without increasing memory space.

The optical disk control chip could be used in a optical disk controller such as a DVD (digital versatile disk) player, a CD-ROM (compact disk read only memory), a CD-RW (compact disk rewrite), a DVD-ROM (digital versatile disk read only memory), or a DVD-RW (digital versatile disk rewrite).

Finally, those skilled in the art should appreciate that they can readily use the disclosed conception and specific embodiment as a basis for designing or modify other structures for carrying put the same purpose of the present invention without departing from the spirit and scope of the invention as defined by the appended claims.

What is claimed is:

1. A memory access apparatus adapted for coupling to a servo controller, a microprocessor and a MPEG unit, comprising:
    a synchronous dynamic random access memory, temporarily storing data decoded by said servo controller and said MPEG unit;
    a flash memory, storing programs and firmware; and
    a memory interface, directly coupled with said servo controller, said microprocessor, said MPEG unit, said synchronous dynamic random access memory and said flash memory,
    wherein, said memory interface accesses only one of said synchronous dynamic random access memory and flash memory at the same time,
    wherein said memory interface at least comprises:
    a single arbiter, receiving a plurality of access requests at the same time;
    a first command signal pin, coupled to said synchronous dynamic random access memory, accessing said synchronous dynamic random access memory while said first command signal pin is enabled; and
    a second command signal pin, coupled to said flash memory, accessing said flash memory while said second command signal pin is enabled;
    further comprising a control signal which could send a corresponding signal to enable one said command signal pin of a selected memory and disable another at the same time according to the executed access request,
    wherein the plurality of access requests received by said arbiter are sent from said servo controller, said microprocessor, and said MPEG unit, and wherein said arbiter decides which one of the plurality of access requests is executed according to request priority,
    wherein said synchronous dynamic random access memory is accessible to said servo controller and said MPEG unit, while said flash memory is only accessible to said microprocessor.

2. The apparatus of claim 1, address pins of said synchronous dynamic random access memory and said flash memory share a same address bus and coupled to address pin of said memory interface.

3. The apparatus of claim 1, data pins of said synchronous dynamic random access memory and said flash memory share a same data bus and coupled to data pin of said memory interface.

4. The apparatus of claim 1, only one of said first and said second command signal pin could be enabled at the same time.

5. The apparatus of claim 1, said apparatus could be used in an optical disk controller such as a DVD (digital versatile disk) player, a CD-ROM (compact disk read only memory), a CD-RW (compact disk rewrite), a DVD-ROM (digital versatile disk read only memory), or a DVD-RW (digital versatile disk rewrite).

6. An optical disk control chip with memory buses sharing apparatus, at least comprising:
    a servo controller, driving a motor to readout disk data in optical storage media;
    a microprocessor;
    a MPEG unit;
    a memory interface, directly coupled with said servo controller, said microprocessor and said MPEG unit, and receiving a plurality of access requests at the same time from said servo controller, said microprocessor, and said MPEG unit respectively;
    a synchronous dynamic random access memory, coupled to said memory interface for temporarily storing data decoded by said servo controller and said MPEG unit; and
    a flash memory, coupled to said memory interface for storing program and firmware,
    wherein said memory interface only access one of said synchronous dynamic random access memory and said flash memory at the same time according to one of the plurality of access requests, said memory interface at least comprising:
    a single arbiter, receiving the plurality of access requests; and
    two command signal pins, coupled to said synchronous dynamic random access memory and said flash memory, respectively, accessing corresponding memory while its respected command signal pin is enabled;
    wherein the plurality of access requests received by said arbiter are sent from said servo controller, said microprocessor, and said MPEG unit, and wherein said arbiter decides which one of the plurality of access requests is executed according to request priority,
    wherein said synchronous dynamic random access memory is accessible to said servo controller and said MPEG unit, while said flash memory is only accessible to said microprocessor.

7. The optical disk control chip of claim 6, wherein said microprocessor is a RISC CPU (reduced instruction set computer central processing unit).

8. The optical disk control chip of claim 6, address pins of said synchronous dynamic random access memory and said flash memory share a same address bus and coupled to address pin of said memory interface.

9. The optical disk control chip of claim 6, data pins of said synchronous dynamic random access memory and said flash memory share a same data bus and coupled to data pin of said memory interface.

10. The optical disk control chip of claim 6, said MPEG unit at least comprises:
   a digital signal processor;
   video decoder; and
   a video processor.

11. The optical disk control chip of claim 10, wherein said digital signal processor is coupled to said memory interface, processing audio signals.

12. The optical disk control chip of claim 10, wherein said video decoder is coupled to said memory interface, decoding video signals.

13. The optical disk control chip of claim 10, where said video processor is coupled to said memory interface, processing decoding video signals.

14. The optical disk control chip of claim 6, wherein only one of said two command signal pins could be enabled at the same time.

15. The optical disk control chip of claim 6, further comprising of a control signal, sending out a corresponding signal, enabling one of said two command signal pins of a selected memory and disabling another according to the executed access request.

16. The optical disk control chip of claim 6, said optical disk control chip could be used in a optical disk controller such as a DVD (digital versatile disk) player, a CD-ROM (compact disk read only memory), a CD-RW (compact disk rewrite), a DVD-ROM (digital versatile disk read only memory), or a DVD-RW (digital versatile disk rewrite).

17. An optical disk control chip with memory buses sharing apparatus, at least comprising:
   a servo controller, driving a motor to readout disk data in optical storage media;
   a microprocessor;
   a MPEG unit;
   a memory interface, directly coupled with said servo controller, said microprocessor and said MPEG unit, and receiving a plurality of access requests at the same time from said servo controller, said microprocessor, and said MPEG unit respectively;
   a synchronous dynamic random access memory, coupled to said memory interface for temporarily storing data decoded by said servo controller and said MPEG unit; and
   a flash memory, coupled to said memory interface for storing program and firmware;
   wherein said memory interface only access one of said synchronous dynamic random access memory and said flash memory according to one of the plurality of access requests, said memory interface at least comprising:
   a single arbiter, receiving the plurality of access requests; and
   two command signal pins, coupled to said synchronous dynamic random access memory and said flash memory, respectively, accessing corresponding memory while its respected command signal pin is enabled;
   further comprising of a control signal, sending out a corresponding signal, enabling one of said command signal pins of a selected memory and disabling another at the same time according to the executed access request,
   wherein said synchronous dynamic random access memory is accessible to said servo controller and said MPEG unit, while said flash memory is only accessible to said microprocessor.

* * * * *